(12) United States Patent
Park et al.

(10) Patent No.: US 6,802,522 B1
(45) Date of Patent: Oct. 12, 2004

(54) IMPACT RELEASING TOW HOOK

(75) Inventors: Sae U Park, Troy, MI (US); Constantinos Sakatis, Oxford, MI (US); Homyoung Kim, South Lyon, MI (US); Mingchao Guo, Windsor, CA (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/452,363

(22) Filed: Jun. 2, 2003

(51) Int. Cl.[7] ................................................ B60D 1/104
(52) U.S. Cl. ........................................................ 280/495
(58) Field of Search ............................... 280/495, 496, 280/498, 480, 503, 504, 762

(56) References Cited

U.S. PATENT DOCUMENTS

| 5,054,806 A | 10/1991 | Chester |
|---|---|---|
| 6,161,867 A | 12/2000 | Tamura |

*Primary Examiner*—Lesley D. Morris
*Assistant Examiner*—Paul Royal, Jr.
(74) *Attorney, Agent, or Firm*—Ralph E. Smith

(57) ABSTRACT

A tow hook assembly for mounting to a front end of a vehicle. The tow hook assembly includes a base plate for mounting to the vehicle, the base plate having a central aperture for aligning over an opening in a mounting base on the vehicle. A tow hook has a shaft and an expanded base, with the aperture in the base plate receiving the shaft, and the expanded base being larger than the aperture to prevent the tow hook from being pulled through the base plate. In response to a frontal impact, however, the tow hook is released from the base plate, the shaft traveling freely through the aperture and the opening in the mounting base, so that minimal force of impact is transferred from the tow hook to the vehicle.

6 Claims, 3 Drawing Sheets

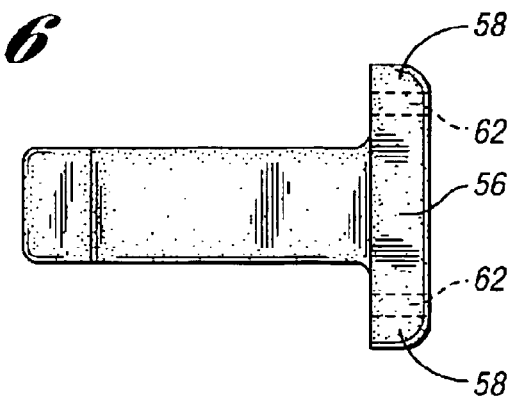
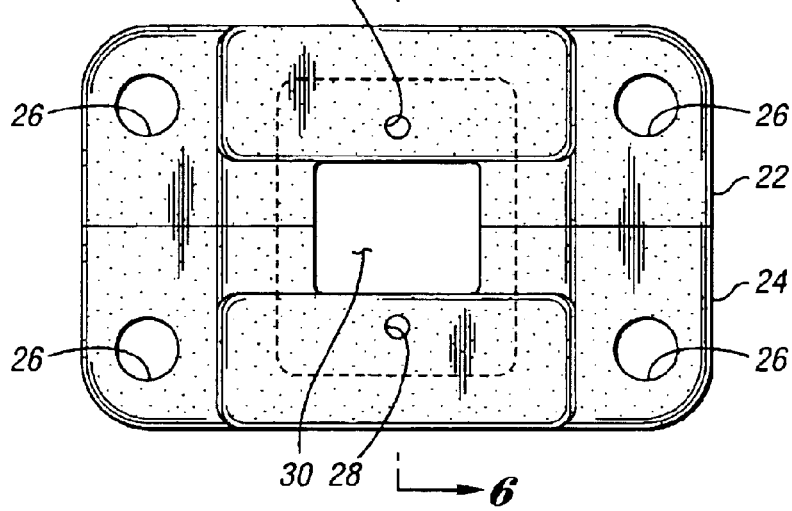
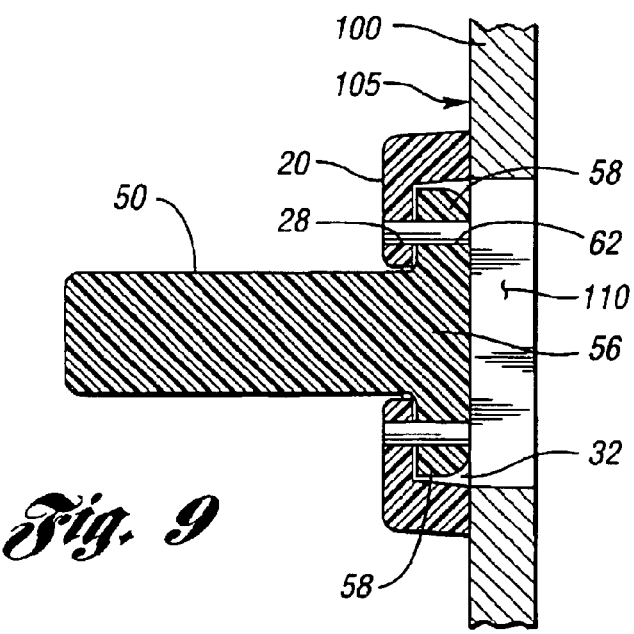

IMPACT RELEASING TOW HOOK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The invention relates to a vehicle-mounted tow book assembly, and more particularly to a tow hook assembly for mounting to the front of a vehicle and adapted to retract into the vehicle so as to transfer minimal force to the vehicle bumper upon a frontal impact.

2. Description of Related Art

Motor vehicles, and particularly trucks, are known to have one or more tow hooks mounted to a front end thereof. These tow hooks provide a convenient attachment point for a rope, strap or cable when the truck is being towed or pulled out of a predicament, or when the truck is doing the pulling from its front end. When the towing or pulling is applied at the rear end of the truck, a trailer hitch or receiver is available for convenient attachment.

Motor vehicles, including trucks, are also required to have supplemental restraint systems, air bags, installed for occupant safety. These supplemental restraint systems are generally intended to activate at the command of a control system that detects a frontal impact of a specified severity. It is not desirable for the air bag to activate without such an impact occurring. The vehicle is also built with a front bumper system that is adapted to readily absorb, in a planned and prescribed fashion, frontal impacts of lesser severity without activating the air bag. A tow hook assembly that is rigidly mounted to a front bumper of the vehicle presents additional challenges to designing for these desirable response characteristics, as the tow hook might protrude from the face of the bumper, and thereby become the initial point of contact during an impact.

It would therefore be advantageous to provide a tow hook assembly that is a convenient anchor for exerting a high pulling force from the front of the vehicle, but that does not transfer substantial force to the front bumper of the vehicle in the event of a frontal impact.

BRIEF SUMMARY OF THE INVENTION

A tow hook assembly for a motor vehicle, the motor vehicle including a mounting base for the tow hook assembly having an opening therethrough, includes a base plate and a tow hook secured to the base plate, the base plate having a central aperture for alignment with the opening and the tow hook having a shaft passing through the central aperture, wherein the tow hook is releasable from the base plate upon imposition of a front impact force.

In a further embodiment, the base plate and the tow hook each further include a pin hole, and the assembly further includes a pin frictionally inserted through the pin hole of the base plate and the pin hole of the tow hook for mounting the tow hook to the base plate.

In a further embodiment, the base plate further includes a plurality of bolt holes for receiving bolts for mounting the base plate to a motor vehicle.

In a further embodiment, the shaft includes an outwardly extending base for engaging a rearward face of the base plate.

In a further embodiment, the base plate is a two-piece construction.

In a further embodiment, the tow hook includes a cleat-type head adapted to receive a line.

In a further embodiment of a tow hook assembly for mounting to a motor vehicle, the motor vehicle includes a generally planar surface with a relief opening therethrough and the tow hook assembly is adapted to mount to the surface in alignment with the relief opening. The tow hook assembly includes a tow hook having an enlarged base end, a shaft, and a hook portion, the base end having a pin hole passing therethrough. A two-piece base plate defines a central aperture and has a front face and a rear face, the rear face being adapted to mount against the motor vehicle with the aperture aligned with the relief opening. The rear face includes a recess surrounding the central aperture adapted to receive the enlarged base end of the tow hook. A pin hole through the base plate aligns with the pin hole in the tow hook so that a pin frictionally inserted in the pin hole of the tow hook and the pin hole of the base plate secures the tow hook to the base plate. The tow hook assembly is adapted to transfer forces in tension applied to the tow hook to the vehicle when the base plate is mounted to the vehicle, and the tow hook is adapted to be released from the base plate and displaced toward the vehicle with the shaft traveling through the central aperture and the relief opening upon application of an impact force to the tow hook.

BRIEF DESCRIPTION OF THE SEVERAL VIEWS OF THE DRAWINGS

The present invention will become more fully understood from the detailed description and the accompanying drawings, wherein:

FIG. 6 is a side view of the tow hook of FIGS. 1–5.

FIG. 7 is a front view of a base plate of the tow hook assembly of FIGS. 1–3.

FIG. 8 is a cross-sectional view taken through line 8—8 of FIG. 7.

FIG. 9 is a cross-sectional view taken through line 9—9 of FIG. 3.

DETAILED DESCRIPTION OF THE INVENTION

Figure 1:
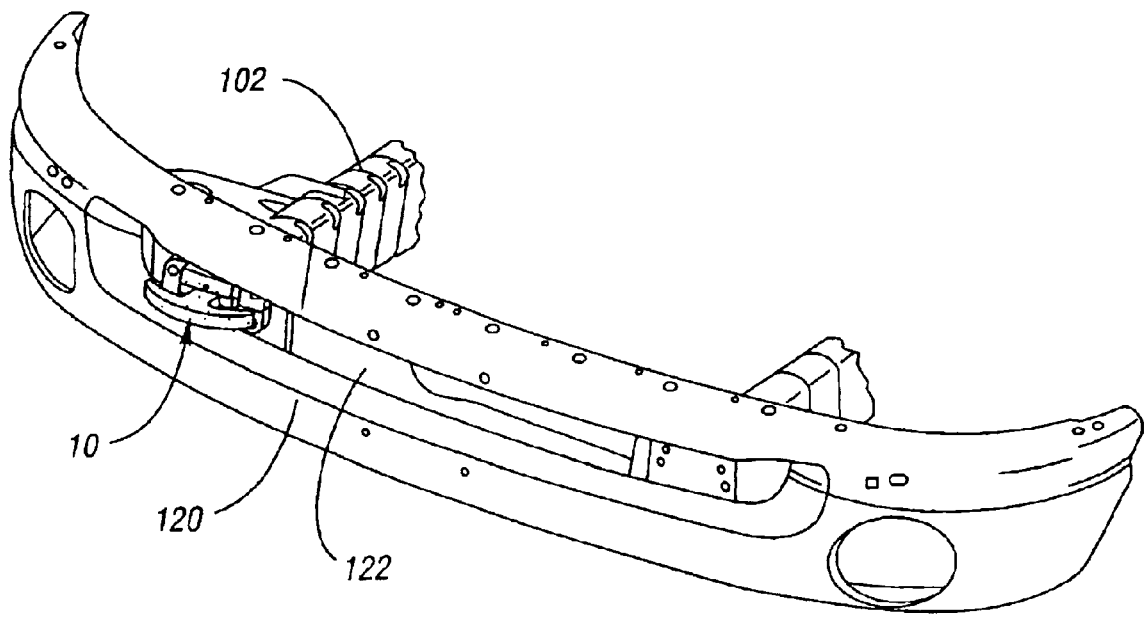
FIG. 1 is a perspective view of a vehicle front end with a mounted impact releasing tow hook assembly according to the invention.
Figure 2:
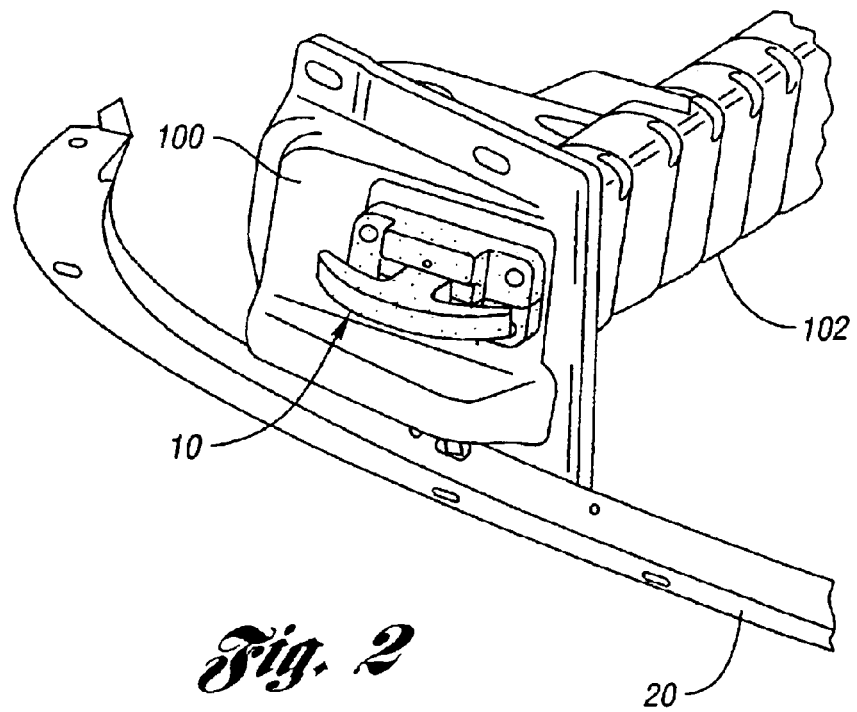
FIG. 2 is an enlarged partial perspective view of the vehicle front end with mounted tow hook assembly of FIG. 1.
Figure 3:
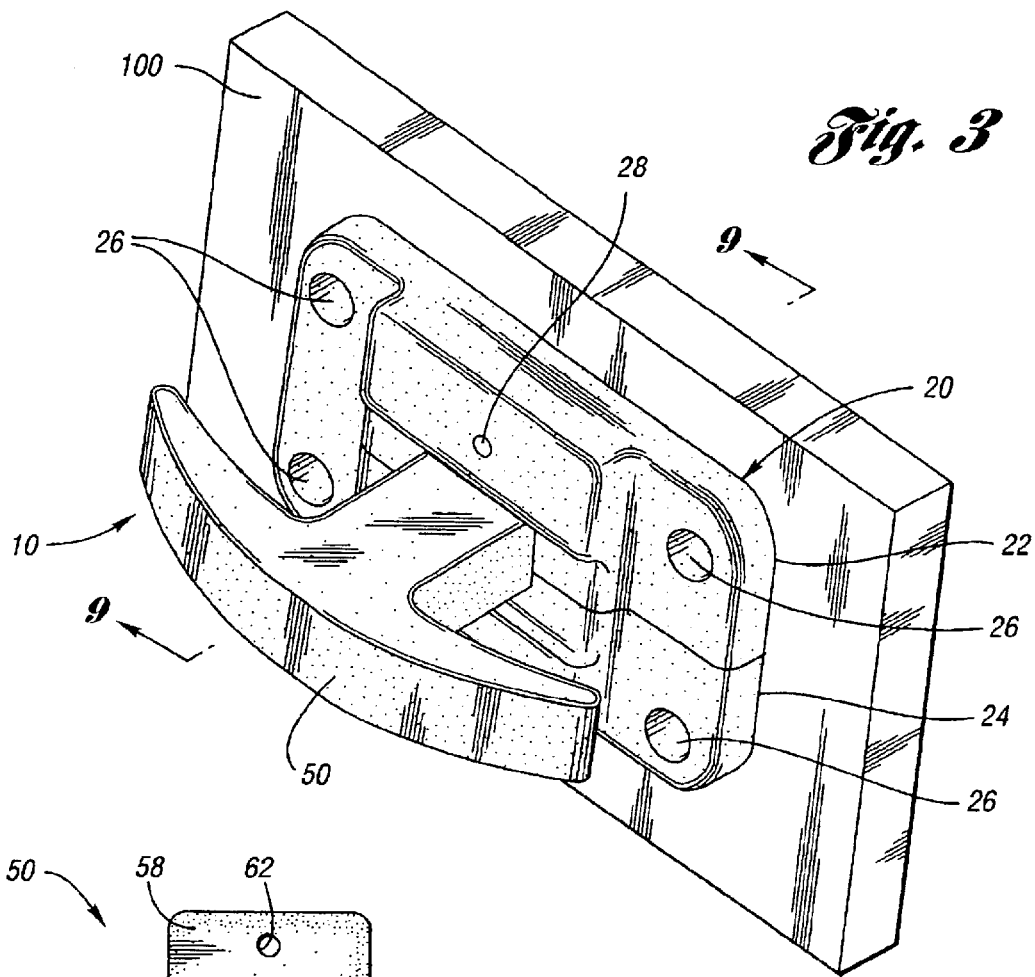
FIG. 3 is a perspective view of the impact releasing tow hook assembly of FIGS. 1–2.
Figure 4:
FIG. 4 is a front view of the tow hook from the tow hook assembly of FIGS. 1–3.
Figure 5:
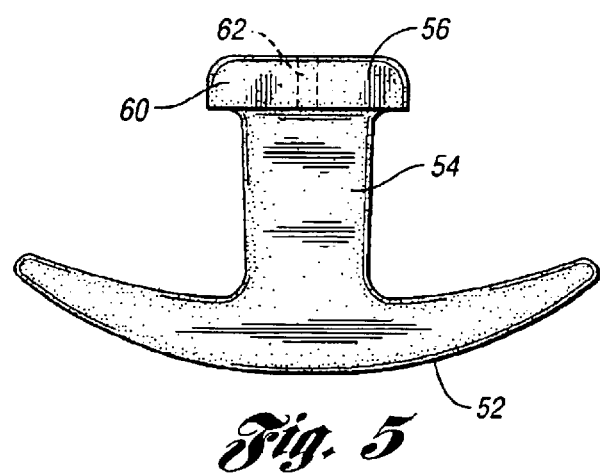
FIG. 5 is a top view of the tow hook of FIGS. 1–4.

Referring to FIGS. 1–2, a tow hook assembly 10 according to the invention is shown mounted to the front end of a representative vehicle. The tow hook assembly 10 is mounted to a mounting base 100 attached to a front end of a frame rail 102 of the vehicle. A vehicle front bumper 120 is mounted to the mounting base 100, and includes an opening 122 through which the tow hook assembly 10 is accessible.

Referring now to FIGS. 3–9, the tow hook assembly 10 comprises a two-piece base plate 20 and a tow hook 50. The disclosed embodiment of the tow hook 50 includes a hook portion 52, a shaft 54, and an expanded base portion 56. The two-piece base plate 20 comprises a pair of substantially identical upper and lower plates 22, 24.

The hook portion 52 of the tow hook 50, as shown in FIGS. 3–6 is depicted as a cleat-type hook for receiving a loop of rope, strap or cable (generically a line), although the hook portion 52 could also take the form of a conventional J-type hook or an eye for attachment of the line. The hook portion 52 extends from the expanded base portion 56 by the shaft 54. The base portion 56 includes vertical extensions 58 and lateral extensions 60. References to vertical and lateral extensions 58, 60 are only in reference to the depicted orientation of the tow hook assembly 10 on the vehicle bumper 100 are should not be considered limiting. Vertical extensions 58 extend further from shaft 54 than lateral extensions 60. Vertical extensions 58 each further include a hook pin hole 62 for frictionally receiving a pin (not shown).

Referring to FIGS. 3 and 7–9, the two-piece base plate 20 comprises upper and lower plates 22, 24. In the disclosed embodiment, plates 22, 24 are substantially identical. Each plate includes a pair of bolt holes 26 and a plate pin hole 28. When placed in the abutting relationship shown in FIGS. 1–3 and 7–9, the plates 22, 24 define an aperture 30 therebetween. As shown in FIGS. 8–9, the base plate 20 further has a rearward surface 34 and a recess 32 surrounding the aperture 30. The plate pin holes 28 pass from the front face of the base plate 20 to the recess 32.

With particular reference now to FIG. 9, the recess 32 is adapted to receive the expanded base 56 of tow hook 50, with shaft 54 passing through aperture 30. In the present embodiment it is anticipated that the plates 22, 24 are assembled around tow hook 50. Plate pin holes 28 and hook pin holes 62 are aligned and pins (not shown) are frictionally inserted to hold the tow hook assembly 10 together. The tow hook assembly 10 is then mounted to the front face 105 of mounting base 100. Mounting base 100 includes an opening 110, and the tow hook assembly 10 is adapted to mount to the base 100 so that the expanded base 56 of tow hook 50 is centered over the opening 110. The opening 110 is slightly larger than the expanded base 56, to allow the base 56 to pass freely through opening 110 in the event of a frontal impact force being exerted on tow hook 50.

The tow hook assembly 10 being securely mounted to the base 100, a towing force imposed on tow hook 50 is transferred to vehicle frame through mounting base 100 as the expanded base 56 of tow hook 50 bears on the rear face 34 of base plate 20 within recess 32. However, should a compression force be imposed on the hook portion 52 of the tow hook 50, such as during a frontal impact, the tow hook 50 will only transfer force to the base plate 20 equal to the friction of the pins (not shown) holding the tow hook 50 to the base plate 20. The expanded base 56 of the tow hook 50 then travels freely rearwardly through the opening 110 in the base 100. The tow hook assembly 10 thereby does not interfere with the impact response designed into the vehicle frame or bumper 120.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A tow hook assembly for a motor vehicle, the motor vehicle including a mounting base for the tow hook assembly having an opening therethrough, the tow hook assembly comprising: a base plate and a tow hook secured to the base plate, the base plate having a central aperture for alignment with the opening and the tow hook having a shaft passing through the central aperture, wherein the tow hook is releasable from the base plate upon imposition of a front impact force, and wherein the shaft comprises an outwardly extending base for engaging a rearward face of the base plate.

2. The tow hook assembly of claim 1, wherein the base plate and the tow hook each further comprise a pin hole, and the assembly further comprises a pin frictionally inserted through the pin hole of the base plate and the pin hole of the tow hook for mounting the tow hook to the base plate.

3. The tow hook assembly of claim 1, wherein the base plate further comprises a plurality of bolt holes for receiving bolts for mounting the base plate to a motor vehicle.

4. The tow hook assembly of claim 1, wherein the base plate is a two-piece construction.

5. The tow hook assembly of claim 1, wherein the tow hook further comprises a cleat-type head adapted to receive a line.

6. A tow hook assembly for mounting to a motor vehicle, the motor vehicle having a generally planar surface and a relief opening therethrough, the tow hook assembly being adapted to mount to the surface in alignment with the relief opening, the tow hook assembly comprising:

a tow hook having an enlarged base end, a shaft, and a hook portion, the base end having a pin hole passing therethrough;

a two-piece base plate defining a central aperture and having a front face and a rear face, the rear face adapted to mount to the motor vehicle with the aperture aligned with the relief opening, the rear face comprising a recess surrounding the central aperture and adapted to receive the enlarged base end of the tow hook, and a pin hole through the base plate in alignment with the pin hole of the tow hook; and a pin frictionally inserted in the pin hole of the tow hook and the pin hole of the base plate for securing the tow hook to the base plate, whereby the tow hook assembly is adapted to transfer forces in tension applied to the tow hook to the vehicle when the base plate is mounted to the vehicle, and whereby the tow hook is adapted to be released from the base plate and displaced toward the vehicle with the shaft traveling through the central aperture and the relief opening upon application of an impact force to the tow hook.

* * * * *